Aug. 26, 1958     R. M. WITT     2,848,835
DEEP SETTER FISHING DEVICE
Filed June 23, 1955
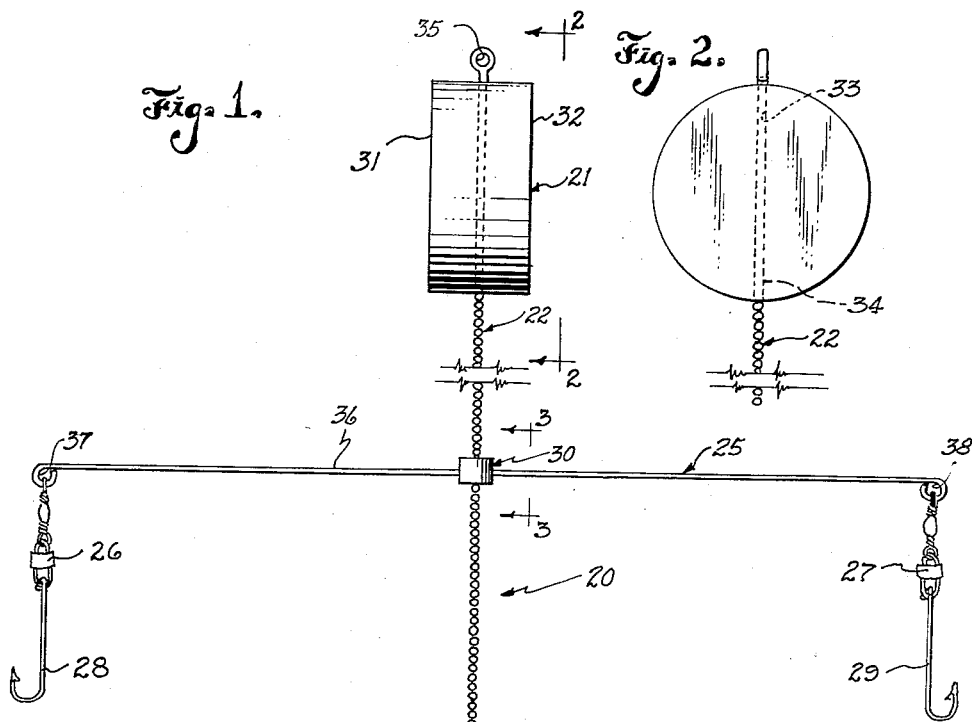
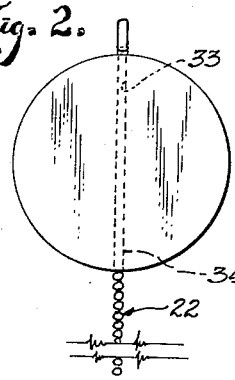
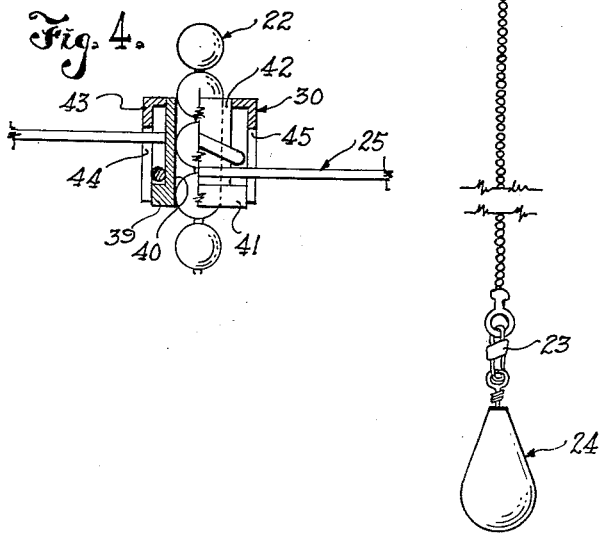
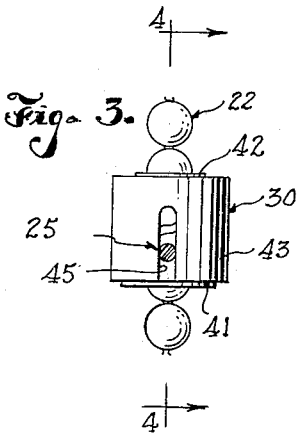
INVENTOR:
Robert M. Witt,
BY: Joseph M. Gartner
ATTY.

United States Patent Office 2,848,835
Patented Aug. 26, 1958

2,848,835
DEEP SETTER FISHING DEVICE
Robert M. Witt, Brookfield, Ill.
Application June 23, 1955, Serial No. 517,542
3 Claims. (Cl. 43—42.74)

This invention relates, in general, to fishing devices, and is particularly concerned with a deep setter adapted for mounting fishhooks, a predetermined distance from the lake bottom.

Otherwise stated, the invention is embodied in a deep setter fishing device having features whereby the bait may be manually adjusted to the exact depth desired by the user.

Another important object and accomplishment of the invention is to provide a deep setter fishing device which permits bait (minnows and the like) to be in a swimming position at all times.

An important feature of the invention resides in a deep setter fishing device which always positions the hooks and bait attached thereto a predetermined distance from the bottom of the lake without requirement of measuring the depth of the water in the stream or lake.

Another important object and accomplishment of the invention is to provide a deep setter fishing device whereby the user may properly adjust and set the position of the bait at any distance from the bottom of the lake as desired.

An ancillary object and accomplishment of the invention is to provide a new and improved deep setter fishing device which is adapted to be economically manufactured and which is so designed as to permit the manufacture and assembly thereof in accordance with present day large scale mass production manufacturing methods of construction and assembly.

The invention seeks as a final object and accomplishment to provide a deep setter fishing device of the character indicated and which is particularly characterized by a design arrangement to more advantageously and satisfactorily perform the functions required of it and adapted to provide a compact unit which will successfully combine the factors of structural simplicity and durability and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described and as more particularly pointed out in the appended claims.

Embodiments of the invention are illustrated in the accompanying drawings forming a part hereof and wherein:

Fig. 1 is a side elevational view illustrating the deep setter fishing device embodying the features of the present invention;

Fig. 2 is a side elevational view of the float mechanism of the deep setter fishing device illustrated in Fig. 1 and being taken substantially on the plane of the line 2—2 in Fig. 1;

Fig. 3 is a side elevational view of the clamp for the horizontally disposed cross bar depicted in Fig. 1 and being taken substantially on the plane of the line 3—3 in Fig. 1; and Fig. 4 is a sectional view of the clamp for the horizontally disposed cross bar depicted in Figs. 1 and 3 and being taken substantially on the plane of the line 4—4 in Fig. 3.

The drawings are to be understood to be more or less of a schematic character for the purpose of illustrating and disclosing a typical or preferred form of the improvements contemplated herein and in the drawings like reference characters identify the same parts in the several views.

In the exemplary embodiment of the invention depicted in Fig. 1, the deep setter fishing device with which the invention is particularly concerned and indicated in its entirety by the numeral 20 comprises, in general, a float 21, a flexible chain or wire 22 depending from said float and having at the lower end thereof securing means 23 for the attachment of a weight 24, a horizontally disposed flexible hook support 25 projecting outwardly from said chain 22 and the terminal ends of which are provided with securing means 26 and 27 respectively to support fishhooks 28 and 29, and a clamping device 30 for adjustably supporting said horizontally disposed fishhook support 25 with respect to said chain 22.

Attention is invited to Figs. 1 and 2 wherein the float 21 is shown to be formed in a generally circular configuration with the sides 31 and 32 thereof being generally flat. It is preferred that the float will be provided with a through aperture 33 adapted to receive portions 34 of the chain 22. The float may be made of cork or other materials having similar characteristics thereof.

The upper terminal end of the chain is provided with an eye 35 to which the end of a fish line may be attached. Although there is illustrated a flexible chain structure as at 22, it is obvious that this could be of a flexible wire or the like to perform the same functions.

In Figs. 1, 3 and 4 it can be seen that the horizontally disposed hook support 25 comprises a one-piece piano wire structure 36, the terminal ends of which are respectively provided with bent eyes 37 and 38 each of which is respectively adapted to receive the securing means 26 and 27 which respectively support the hooks 28 and 29. The horizontally disposed supporting means 25 is flexible and will bend in accordance with the loads or conditions to which it is subjected.

An important feature of the invention is the clamping device 30 which is operable to support the horizontally disposed fishhook support in adjusted positions along the chain 22. Moreover, the clamp 30 permits revolving movement of the fishhook support 25 about the chain 22 so that bait such as, for example, minnows can freely swim about.

In Fig. 4 it can be seen that the clamp 30 comprises an inverted T-shaped member 39 provided with a through bore 40 adapted to snugly receive the chain 22. The lower region of the T-shaped member is provided with a flange 41. In Fig. 4 the piano wire fishhook support 25 is shown wrapped around the barrel portions 42 of the inverted T-shaped member 39 and projects horizontally outwardly therefrom. In order to tightly maintain the horizontal fish support 25 in its position with respect to the inverted T-shaped member 39 there is provided a cup-shaped cover 43 having slotted openings 44 and 45 respectively to receive outwardly projecting portions of the horizontally disposed fishhook support 25.

In assembly of the clamp 30 the piano wire fishhook support 25 is wound about the barrel portion 42 of the inverted T-shaped member 39 as shown in Fig. 4 and thereafter the cover 43 is forced into its proper position as shown thereby to clamp and maintain these parts in their respective operative positions. The chain is fitted through the through bore 40 and the clamping device may then be moved along the chain 22 responsive to manual movement by the operator. The adjustability of the position of the fishhook support 25 is important because the operator may desire positioning the fishhooks at a predetermined distance from the bottom of the lake or river.

Because of the snug fit between the through bore 40 and the periphery of the chain 22, slight manual force exerted upon the clamping member will move the same along the chain but the fit between these members is tight enough for the clamping member 30 to maintain its position with respect to the chain 22 after the operator has positioned the same.

In operation the fisherman may use a conventional bamboo fish pole or a casting pole with the end of the fish line being attached to the eye 35. The clamp 30 is manually adjusted a predetermined distance from the weight means 24 which would be equivalent to the distance from the bottom of the lake which the fisherman desires the bait to lie. The line is cast out in the usual manner and the weight 24 will seek the bottom of the lake while the float 21 will tend to rise in the water and maintain the chain in a horizontal position. Because the clamp 30 is supported by the chain 22 the horizontally disposed fishhook support will be maintained at the desired distance from the bottom of the lake or river. The fishhook support 25 may swivel about the chain 22 as a result of the swimming action of the minnows respectively attached to the hooks 28 and 29. This action will give a resemblance to live bait and is conducive to attract fish.

The instant deep setter fishing device being formed of simple parts and readily available materials lends itself to mass production manufacturing principles, thus affording a substantial saving in the manufacturing costs.

From the foregoing disclosure, it may be observed that I have provided an improved deep setter fishing device which efficiently fulfills the objects thereof as hereinbefore stated and which provides numerous advantages which may be summarized as follows:

(1) Structurally simple, efficient and durable;
(2) Economical to manufacture and readily adaptable to mass production manufacturing principles; and
(3) The provision of an improved deep setter fishing device which always maintains the hooks and bait attached thereto a predetermined distance from the bottom of the lake without requirement of measuring the depth of the water in the stream or lake.

While I have illustrated preferred embodiments of my invention, many modifications may be made without departing from the spirit of the invention and I do not wish to be limited to the precise details of construction set forth but wish to avail myself of all changes within the scope of the appended claims.

I claim:

1. A deep setter fishing device comprising a float, a flexible vertically extending ball type chain one end of which is connected to said float and the other end of which is provided with a weight, a horizontally disposed wire-like flexible fish hook support extending outwardly from and at each side of said ball type chain, a clamp for adjustably attaching said fish hook support to said ball type chain, said clamp being arranged to permit said ball type chain to pass therethrough and said clamp being normally held in position by friction between portions of the clamp and the ball type chain but said clamp being manually movable along said chain, and said clamp comprising an inverted T-shaped member upon which portions of said wire-like flexible fish hook support are wound thereupon to maintain said fish-hook support at a right angle relationship with respect to said ball type chain, and said clamp having a cap-like member disposed over portions of said inverted T-shaped member and arranged to maintain wound portions of said wire-like fish hook support in proper relationship with respect to said clamp.

2. A deep setter fishing device comprising a float, a flexible vertically extending ball type chain one end of which is connected to said float and the other end of which is provided with a weight, a horizontally disposed wire-like flexible fish hook support extending outwardly from and at each side of said ball type chain, a clamp for adjustably attaching said fish hook support to said ball type chain, and said clamp comprising an inverted T-shaped member upon which portions of said wire-like flexible fish hook support are wound thereupon to maintain said fish hook support at a right angle relationship with respect to said ball type chain.

3. A deep setter fishing device comprising a float, a flexible vertically extending ball type chain one end of which is connected to said float and the other end of which is provided with a weight, a horizontally disposed wire-like flexible fish hook support extending outwardly from and at each side of said ball type chain, a clamp for adjustably attaching said fish hook support to said ball type chain, said ball type chain passing through said clamp and said clamp being normally held in position by friction between portions of the clamp and the ball type chain but said clamp being manually movable along said chain, and said clamp having means upon which portions of said wire-like flexible fish hook support are wound thereupon to maintain said fish hook support at a right angle relationship with respect to said ball type chain.

References Cited in the file of this patent

UNITED STATES PATENTS

| | | |
|---|---|---|
| 289,612 | Bollermann | Dec. 4, 1883 |
| 1,720,287 | Moore | July 9, 1929 |
| 2,219,983 | Evenson | Oct. 29, 1940 |
| 2,545,326 | Westfall et al. | Mar. 13, 1951 |
| 2,576,880 | Jensen | Nov. 27, 1951 |
| 2,769,270 | Williams | Nov. 6, 1956 |